(12) United States Patent
Baik

(10) Patent No.: US 8,887,627 B1
(45) Date of Patent: Nov. 18, 2014

(54) BARBECUE APPARATUS

(71) Applicant: Rang Gi Baik, Siheung (KR)

(72) Inventor: Rang Gi Baik, Siheung (KR)

(*) Notice: Subject to any disclaimer, the term of this patent is extended or adjusted under 35 U.S.C. 154(b) by 0 days.

(21) Appl. No.: 14/231,956

(22) Filed: Apr. 1, 2014

(30) Foreign Application Priority Data

Dec. 5, 2013 (KR) .................... 20-2013-0010023 U (51) Int. Cl.
*A47J 37/07* (2006.01)
*A47J 37/04* (2006.01)

(52) U.S. Cl.
CPC ............ *A47J 37/0709* (2013.01); *A47J 37/047* (2013.01); *A47J 37/0745* (2013.01); *A47J 37/0704* (2013.01); *A47J 37/0713* (2013.01)
USPC ............. 99/339; 99/421 P; 99/427; 126/41 B (58) Field of Classification Search
CPC ....... A47J 37/047; A47J 37/049; A47J 37/04; A47J 37/041
USPC ......... 99/421 P, 427, 340, 339; 219/411, 393, 219/395, 404; 126/41 B
See application file for complete search history.

(56) References Cited

U.S. PATENT DOCUMENTS

| 3,273,489 | A | * | 9/1966 | Wilson | ...................... 99/421 HV |
| 4,574,689 | A | * | 3/1986 | Robertson | ........................ 99/337 |
| 5,974,952 | A | * | 11/1999 | Riccio | .............................. 99/339 |
| 6,810,792 | B1 | * | 11/2004 | Knight | ............................. 99/340 |

FOREIGN PATENT DOCUMENTS

| KR | 20-0179438 Y1 | 4/2000 |
| KR | 20-0206805 Y1 | 12/2000 |
| KR | 20-0227462 Y1 | 6/2001 |

* cited by examiner

Primary Examiner — Reginald L Alexander (57) ABSTRACT

Provided is a barbecue apparatus which uses charcoal, gas or electricity as a main heat source and does not allow only barbecuing with the addition of auxiliary heating source such as a halogen lamp, but also enables a long term heat retention of the meat barbecued hereby.

5 Claims, 7 Drawing Sheets

BARBECUE APPARATUS

CROSS-REFERENCE TO RELATED APPLICATIONS

This U.S. non-provisional patent application claims priority under 35 U.S.C. §119 of Korean Utility Model Application No. 20-2013-0010023, filed on Dec. 5, 2013, the entire contents of which are hereby incorporated by reference.

BACKGROUND OF THE INVENTION

The present invention disclosed herein relates to a barbecue apparatus, and more particularly to, a barbecue apparatus which uses charcoal, gas or electricity as a main heat source and does not allow only barbecuing with the addition of auxiliary heating source such as a halogen lamp, but also enables a long term heat retention of the meat barbecued hereby.

Generally, a barbecue apparatus is devised for barbecuing meat by use of charcoal, gas or electricity. Various types of barbecue apparatuses are disclosed in Korean Utility Model No. 20-0227462 entitled "Rotary Loess Charcoal Barbecue Roaster", Korean Utility Model No. 20-0179438 entitled "Charcoal Barbecue Oven Apparatus", and Korean Utility Model No. 20-0206805 entitled "Portable Charcoal Barbecue Roaster".

Typical barbecuing apparatuses use charcoal as a source of heat for roasting meat. In other words, hot rising heat roasts meat. Accordingly, when the burning charcoal is removed after the roasting of the meat, the meat cools fast and is difficult to keep warm.

When charcoal is not removed to keep the warmth of the meat, the meat may be burned. Accordingly, there is a limitation in that it is difficult to provide properly-cooked meat at right time.

SUMMARY OF THE INVENTION

The present invention provides a barbecue apparatus, which uses char coal, gas or electricity as a main heat source and does not allow only barbecuing with the addition of an auxiliary heat source such as a halogen lamp, but also enables a long term heat retention of the meat barbecued hereby.

Embodiments of the present invention provide barbecue apparatuses having a roasting space in which meat is roasted and roasting meat by heating the roasting space, the apparatus including: a main body including a casing of a box shape with a top thereof opened so as to form the roasting space, a cover disposed on an upper part of the casing to open/close the roasting space of the casing and having a smoke hole for discharging smoke from roasting of meat in the roasting space, and a first hinge disposed to connect the casing and the cover so as to open/close the cover; a roasting part including circular plates disposed at left and right sides to roast meat in the roasting space provided in the main body, roasting bars whose ends are disposed at a certain interval along the circumference of the circular plate, and a shaft outwardly protruding from a center of the circular plate equipped with the roasting bars; a driving part including a gear and a motor that are coupled to and rotate the shaft so as to rotate the roasting part; a main heating source including one or both of a charcoal basket and a burner disposed at a lower part of the roasting space to heat the roasting space such that meat is roasted in the roasting space of the main body; and an auxiliary heat source disposed at an upper part of the roasting space to provide heat to the roasting space separately from the main heating source such that meat roasted by the main heating source keeps warm when the main heating source is removed, wherein the auxiliary heat source including a halogen lamp includes; an opening formed in a rear surface of the casing such that the halogen lamp is disposed at an upper part of the roasting space so as to be adjacent to the roasting part disposed in the roasting space; a cover part protruding from the rear surface of the casing to block the opening and providing an installation space in which the halogen lamp is disposed; and a second hinge disposed to connect the cover part and the rear surface of the casing such that the cover part opens/closes, and the halogen lamp disposed in the installation space is replaced by the second hinge.

In some embodiments, the roasting part may be configured such that the centers of the circular plates disposed on the left and right sides thereof are connected by a connecting bar, the roasting bars are detachably coupled to the circular plate, both ends of the roasting bar are formed to have a hexagonal head, fitting slits are formed along the circumferential direction of the circular plate so as to divide the circular plate into four equal parts and the hexagonal head of the roasting bar is detachably coupled to the fitting slits.

In other embodiments, the roasting part may include a grill rack in which meat is seated, and may be configured such that a protruding peg disposed at a quarterly position along the circumference on the inner side of the circular plate hooks the grill rack and the grill rack rotates suspending on the protruding peg while maintaining a horizontal state by the roasting part.

In still other embodiments, the barbecue apparatus may include an inclination plate disposed at a lower end portion of the roasting space such that oozing drops of fat from roasting gather at one place and a fat drain hole formed at a lowermost portion of the inclination plate.

In even other embodiments, the barbecue apparatus may include a tempered glass disposed in the cover such that roasted meat is checked with naked eyes and a grip disposed on a front surface of the cover to allow a user to open/close the cover by the first hinge.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, exemplary embodiments of the present invention will be described in more detail with reference to the accompanying drawings.

As shown in the drawings, a barbecue apparatus according to an embodiment of the present invention may include a main body 110 having a roasting space 102 provided therein, where meat can be roasted by heating the roasting space 102.

The main body 110 may include a casing 112, a cover 114 and a first hinge 116. The casing 112 may be formed to have a box shape with the top opened, and may have a roasting space 102 formed therein.

Also, the bottom surface of the casing 112 may be configured for inclination plate 104 to be disposed under the roasting space 102 such that fat drops from roasting meat may gather at one place, where fat drain hole 106 is formed at the lowest point of the inclination plate 104.

The cover 114 may be formed at the top of the casing 112 so as to open and close a roasting space 102 of the casing 112. A smoke hole 114a may be formed on the cover 114 such that smoke generated during the roasting of meat in a roasting space 102 can be discharged. The smoke hole 114a may be formed to penetrate the upper and lower portions of the cover 114.

Also, a first hinge 116 may be disposed to connect the casing 112 and the cover 114 so as the open/close the cover 114. Thus, the cover 114 of the casing 112 by the first hinge 116 may be opened or closed by the first hinge 116.

In this case, the grip 115 may be disposed on the front surface of the cover 114 to easily open/close the cover 114 by the first hinge 116. Accordingly, the cover 114 may be easily opened and closed using the grip 115.

Also, a tempered glass 118 may be disposed in the cover 114 so as to easily check roasted meat with naked eyes. The tempered glass 118 may be disposed to replace a portion of the cover 114 such that a user can easily check the state of roasted meat with naked eyes through the tempered glass 118.

As shown in the drawings, a barbecue apparatus according to an embodiment of the present invention may include a roasting part 120. The roasting part 120 may be disposed in the roasting space 102 of the main body 110 so as to roast meat.

The roasting part 120 may have circular plates 122 disposed at the left and right sides thereof that are spaced from each other by a certain distance. The circular plates 122 may be fixed to both ends of roasting bars 124. In this case, the roasting bars may be disposed along the circumference of the circular plates 122 at a certain interval.

Also, the circular plate 122 may include a shaft 126 that is configured to protrude outward from the center of the circular plate 122. The shaft 126 may be connected to a gear 132 disposed in a driving part 130 so as to rotate.

In the roasting part 120, the centers of the circular plates 122 disposed on the left and right sides hereof may be connected to each other through a connecting bar 121, and roasting bars 124 may be detachably coupled to the circular plates 122. In this case, both ends of the roasting bar 124 may be formed to have a hexagonal head 124a. Fitting slits 122a may be formed along the circumference of the circular plate 122 to divide the circular plate 122 into four equal parts, allowing the hexagonal head 124a of the roasting bars 124 to be detachably coupled to the fitting slits 122a.

Also, the roasting part 120 may be equipped with a grill rack 128 on which meat can be placed. A protruding peg 129 may be disposed at a quarterly position along the circumference on the inner side of the circular plate such that the grill rack 128 can suspend on the protruding peg 129. When the roasting part 120 rotates with the grill rack 128 suspending on the protruding peg 129, the grill rack 128 may rotate while maintaining the horizontal state.

Chicken, duck and sweet potato may be placed in pieces in the grill rack 128 and may be roasted. Also, a whole pork may be tied onto the roasting bar 124 and rotated for roasting.

As shown in the drawings, a barbecue apparatus according to an embodiment of the present invention may include a driving part 130. The driving part 130 may include a gear 132 and a motor 134 such that the roasting part 120 can rotate.

In the driving part 130, the shaft 126 may be coupled to the gear 132, and may be rotated by the gear 132 rotated by the motor 134, allowing the roasting part 120 to rotate.

A user may rotate the shaft 126 by operating the motor 134 using a driving motor switch 173.

Meanwhile, a separate auxiliary handle 127 may be coupled to the shaft 126. When the shaft 126 cannot be rotated by the motor 134, e.g., due to electricity outage, a user may rotate the auxiliary handle 127 to forcibly rotate the shaft 126.

As shown in the drawings, a barbecue apparatus according to an embodiment of the present invention may include a main heat source part 140. The main heat source part 140 may heat the roasting space 102 such that meat can be roasted in the roasting space 102 provided in the main body 110.

The main heat source part 140 may be disposed at a lower part of the roasting space 102 provided in the main body 110, and may heat the whole of the roasting space 102, allowing meat to be roasted in the roasting space 102. The main heat source part 140 may include either or both of a detachable charcoal basket 142 and a burner 144. In this case, the burner 144 may be a gas burner that uses gas for fuel.

The whole of the roasting space 102 may be heated to roast meat by placing burning charcoal in the detachable charcoal basket 142.

The detachable charcoal basket 142 may be easily separated through one side of the casing 112.

Figure 1:
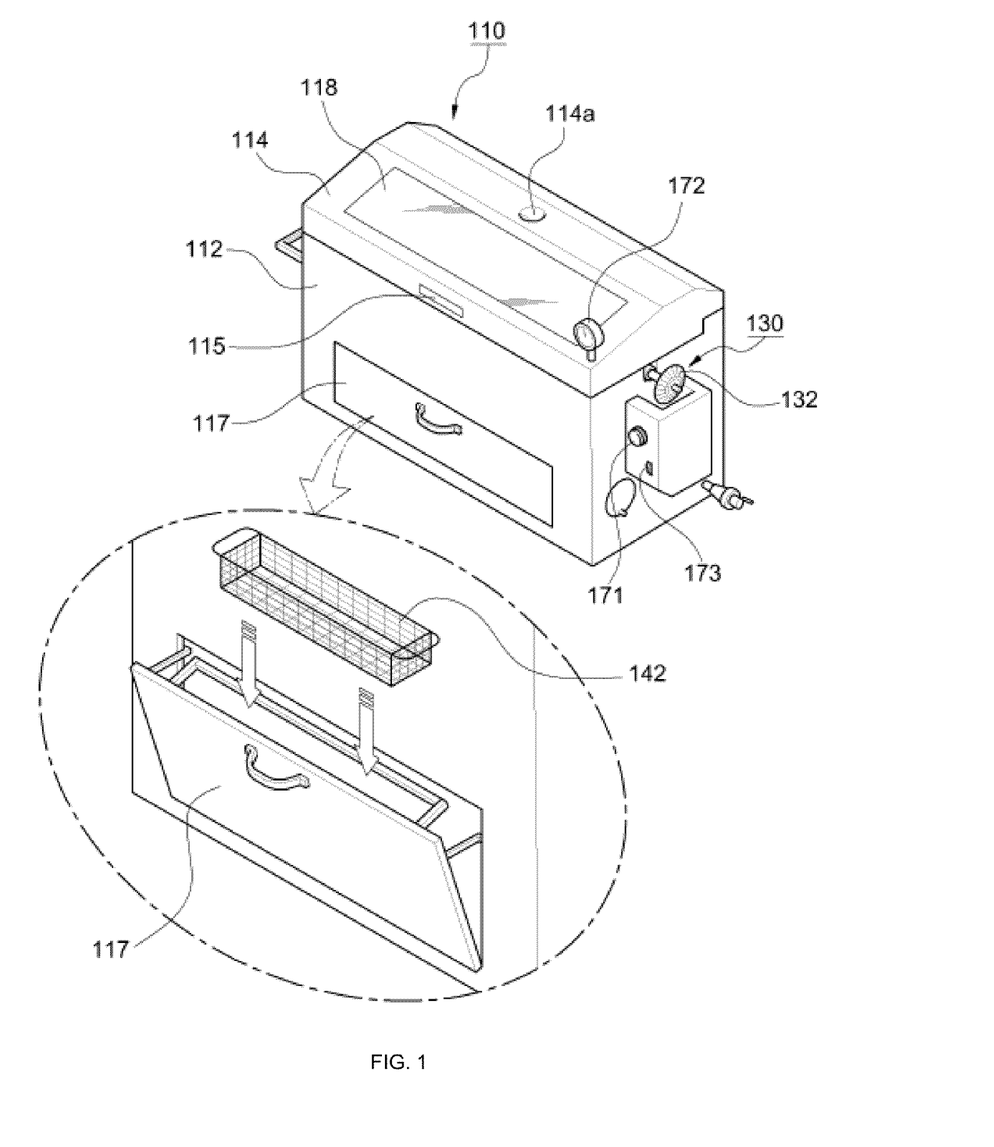
FIG. 1 is a perspective view illustrating a barbecue apparatus according to an embodiment of the present invention.
Figure 2:
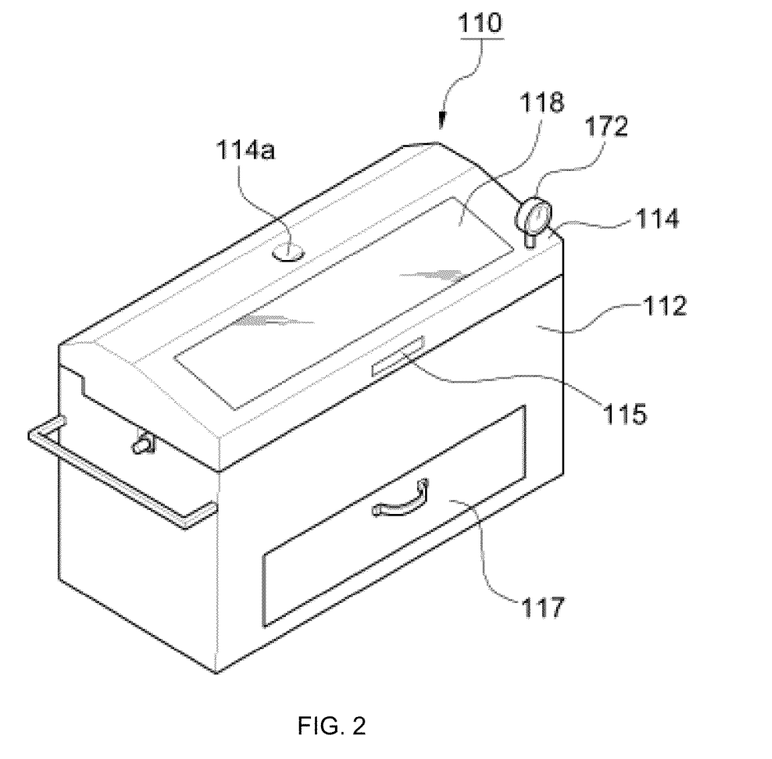
FIG. 2 is a perspective view illustrating a barbecue apparatus from an angle different from as in FIG. 2 according to an embodiment of the present invention.
Figure 3:
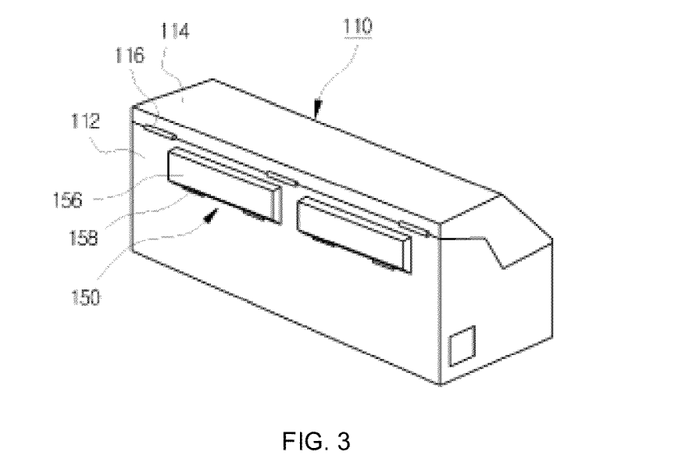
FIG. 3 is a perspective view illustrating a rear surface of a barbecue apparatus such that an auxiliary heat source disposed in the barbecue apparatus can be shown according to an embodiment of the present invention.
Figure 4:
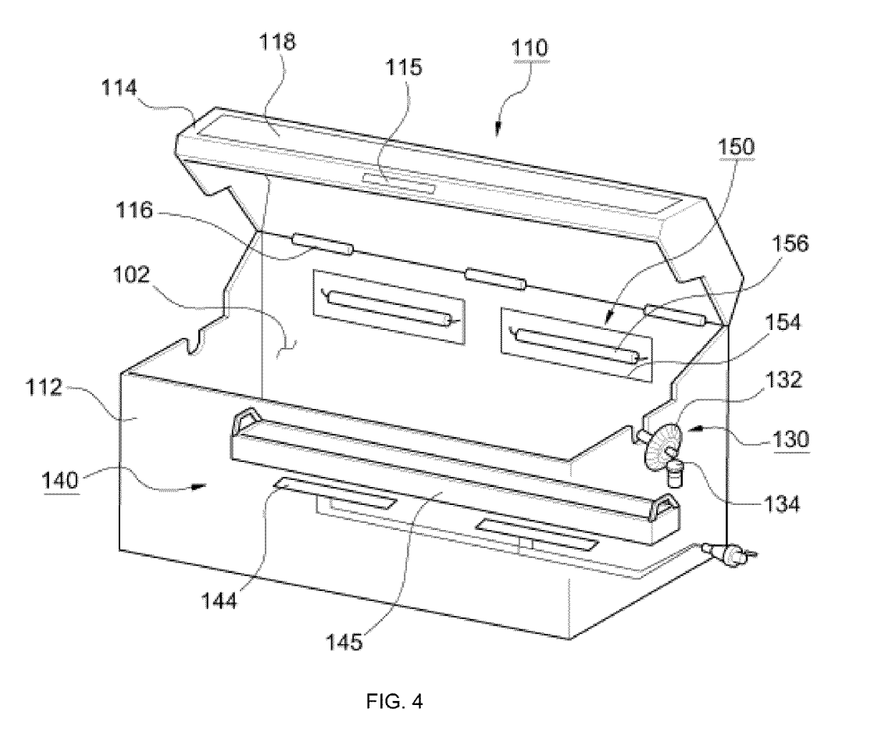
FIG. 4 is a perspective view illustrating a barbecue apparatus with the cover opened for showing an internal structure thereof according to an embodiment of the present invention.
Figure 5:
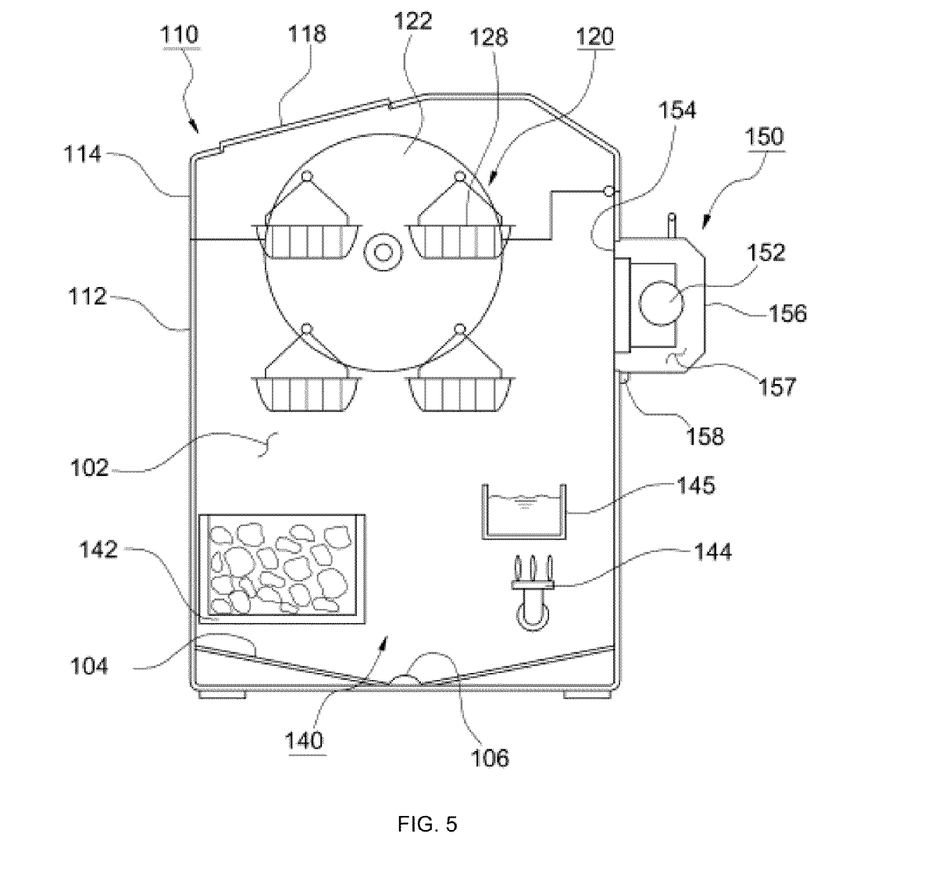
FIG. 5 is a drawing illustrating an internal structure of a barbecue apparatus according to an embodiment of the present invention.
Figure 6:
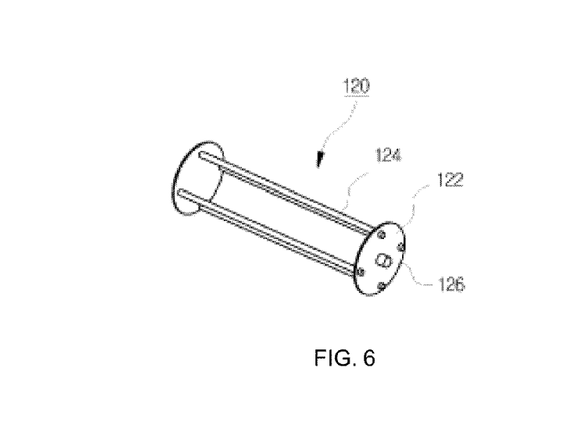
FIG. 6 is a perspective view illustrating an example of a roasting part according to an embodiment of the present invention.
Figure 7:
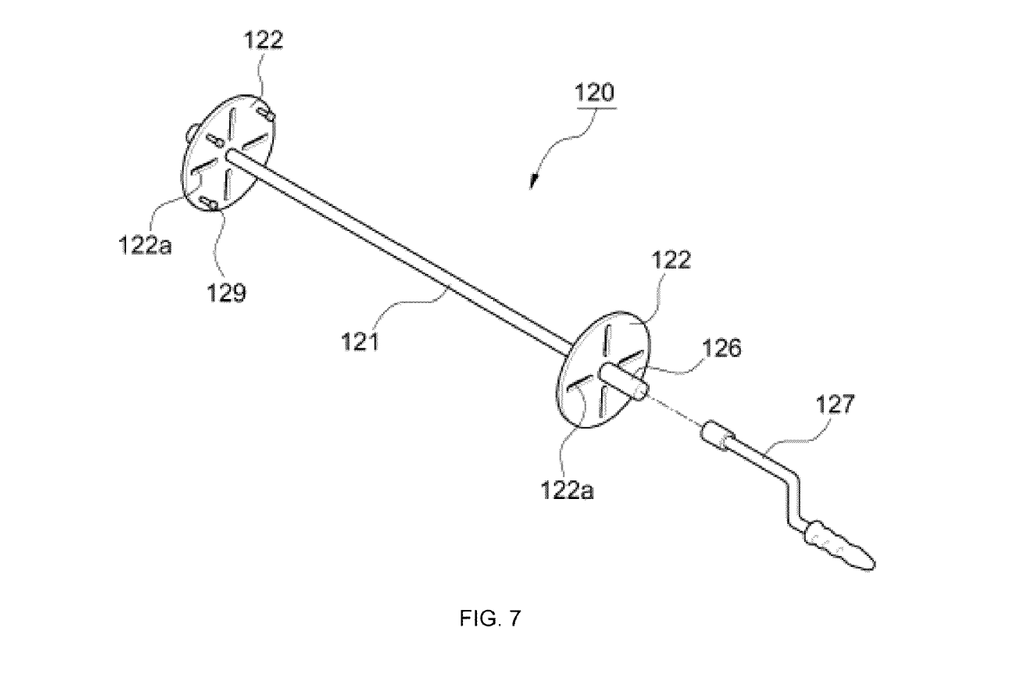
FIG. 7 is a perspective view illustrating another example of a roasting part according to an embodiment of the present invention.
Figure 8:
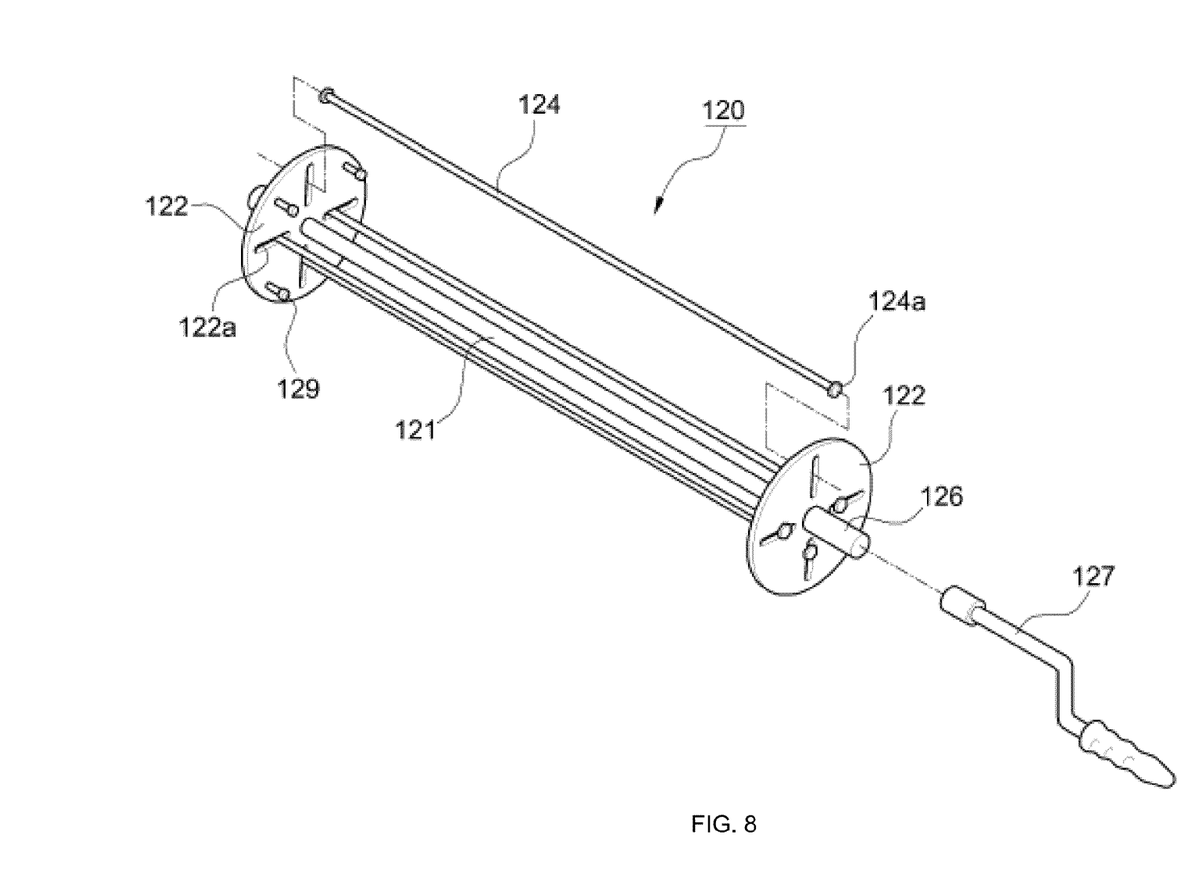
FIG. 8 is a perspective view illustrating a roasting bar to be detachably coupled to the roasting part shown in FIG. 7.
Figure 9:
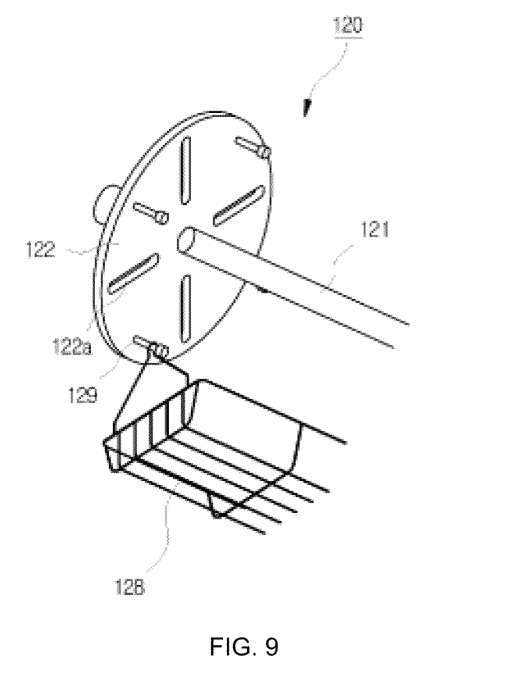
FIG. 9 is a perspective view illustrating a grill rack suspending on the roasting part shown in FIG. 7.

For example, as shown in FIG. 1, a user may open a front door 117 to place the detachable charcoal basket 142 on a stand disposed inside the front door, and then may close the front door 117. Thus, a user may insert the detachable charcoal basket 142 into the casing 112 or may separate the detachable charcoal basket 142 from the casing 112.

As shown in the drawings, a barbecue apparatus according to an embodiment of the present invention may include an auxiliary heat source part 150. The auxiliary heat source part 150 may be disposed to provide heat to the roasting space 102 separately from the main heat source part 140

The auxiliary heat source part 150 may be disposed at an upper side of the roasting space 102 such that meat roasted by the main heat source part 140 can keep warmth even after the main heat source part 150 is removed. The auxiliary heat source part 150 may also enable roasting without the main heat source part 140.

The auxiliary heat source part 150 may include a halogen lamp 152. The halogen lame 152 may be disposed at an upper part of the roasting space 102 so as to be close to the roasting part 120 disposed in the roasting space 102. For this, an opening 154 may be formed in an upper part of the rear surface of the casing 112.

Meanwhile, the main heat source part 140 may further include a water tank 145.

The water tank 145 may be disposed over the burner 144 and may be seated inside the casing 112 while being filled with water. The water tank 145 may be formed of a metallic material, and may be heated by the burner 144 to generate vapor. The generated vapor may directly be applied to meat being roasted by the roasting part 120, and may serve to prevent the meat juice from drying.

Meanwhile, a barbecue apparatus according to an embodiment of the present invention may further include a converter temperature controller 171 that is disposed to control a target temperature of the auxiliary heat source part 150, and a temperature gauge 172 that indicates the temperature of the auxiliary heat source part 150.

Also, a cover part 156 is disposed to protrude to the rear surface of the casing 112 to block the opening 154. The cover part 156 may provide an installation space 157 in which the halogen lamp 152 can be disposed.

Meanwhile, a second hinge 158 may be disposed to connect the cover part 156 and the rear surface of the casing 112 such that the cover part 156 may open/close. The halogen lamp 152 disposed in the installation space 157 may be replaced by means of the second hinge 158.

The barbecue apparatus according to the embodiment of the present invention may barbecue by rotating the roasting part 120 using the driving part 130 while meat is being fixed to the roasting bar 124 or the meat is being seated on the grill rack 128. In this case, a method of fixing meat to the roasting part 120 may be a well-known method.

In this case, the roasting space 102 may be heated by placing burning charcoal in the detachable charcoal case 142 of the main heat source part 140, or may be heated by flame of the burner 144 supplied with gas. Additionally, the roasting space 102 may be heated by a halogen lamp 152 of the auxiliary heat source part 150 to more quickly roast meat When meat is roasted in the roasting space 102, the main heat source part 140 may be cut off so as not to burn the roasted meat. In other words, charcoal may be removed from the detachable charcoal case 142, and gas supplied to the burner 144 may be blocked such that the roasting space 102 is not heated by the main heat source part 140.

However, when the heating by the main heat source part 140 is removed, roasted meat may cool fast. According to an embodiment of the present invention, roasted meat can be prevented from cooling by continuously providing auxiliary heating to the roasting space 102 using the halogen lamp 152 of the auxiliary heat source part 150.

Accordingly, roasted meat can be kept warm for a long time only by the auxiliary heat source without the main heat source.

According to the embodiments of the present invention, a barbecue apparatus can quickly roast meat with an auxiliary heat source in addition to a main heat source, and can also provide properly-cooked meat at right time by keeping already-cooked meat warm for a long time only with an auxiliary heat source without a main heat source.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A barbecue apparatus having a roasting space in which meat is roasted and roasting meat by heating the roasting space, the apparatus comprising:
   a main body comprising a casing of a box shape with a top thereof opened so as to form the roasting space, a cover disposed on an upper part of the casing to open/close the roasting space of the casing and having a smoke hole for discharging smoke from roasting of meat in the roasting space, and a first hinge disposed to connect the casing and the cover so as to open/close the cover;
   a roasting part comprising circular plates disposed at left and right sides to roast meat in the roasting space provided in the main body, roasting bars whose ends are disposed at a certain interval along the circumference of the circular plate, and a shaft outwardly protruding from a center of the circular plate equipped with the roasting bars;
   a driving part comprising a gear and a motor that are coupled to and rotate the shaft so as to rotate the roasting part;
   a main heating source comprising one or both of a charcoal basket and a burner disposed at a lower part of the roasting space to heat the roasting space such that meat is roasted in the roasting space of the main body; and
   an auxiliary heat source disposed at an upper part of the roasting space to provide heat to the roasting space separately from the main heating source such that meat roasted by the main heating source keeps warm when the main heating source is removed,
   wherein the auxiliary heat source comprising a halogen lamp comprises;
   an opening formed in a rear surface of the casing such that the halogen lamp is disposed at an upper part of the roasting space so as to be adjacent to the roasting part disposed in the roasting space
   a cover part protruding from the rear surface of the casing to block the opening and providing an installation space in which the halogen lamp is disposed; and
   a second hinge disposed to connect the cover part and the rear surface of the casing such that the cover part opens/closes, and
   the halogen lamp disposed in the installation space is replaced by the second hinge.

2. The barbecue apparatus of claim 1, wherein the roasting part is configured such that the centers of the circular plates disposed on the left and right sides thereof are connected by a connecting bar, the roasting bars are detachably coupled to the circular plate, both ends of the roasting bar are formed to have a hexagonal head, fitting slits are formed along the circumferential direction of the circular plate so as to divide the circular plate into four equal parts and the hexagonal head of the roasting bar is detachably coupled to the fitting slits.

3. The barbecue apparatus of claim 1, wherein the roasting part comprises a grill rack in which meat is seated, and is configured such that a protruding peg disposed at a quarterly position along the circumference on the inner side of the circular plate hooks the grill rack and the grill rack rotates suspending on the protruding peg while maintaining a horizontal state by the roasting part.

4. The barbecue apparatus of claim 1, comprising an inclination plate disposed at a lower end portion of the roasting space such that oozing drops of fat from roasting gather at one place and a fat drain hole formed at a lowermost portion of the inclination plate.

5. The barbecue apparatus of claim 1, comprising a tempered glass disposed in the cover such that roasted meat is checked with naked eyes and a grip disposed on a front surface of the cover to allow a user to open/close the cover by the first hinge.

\* \* \* \* \*